(12) United States Patent
Morovic et al.

(10) Patent No.: US 11,415,462 B2
(45) Date of Patent: Aug. 16, 2022

(54) EMULATING A SPECTRAL MEASUREMENT DEVICE

(71) Applicant: Hewlett-Packard Development Company, L.P., Spring, TX (US)

(72) Inventors: Peter Morovic, Sant Cugat del Valles (ES); Jan Morovic, London (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 151 days.

(21) Appl. No.: 16/978,505

(22) PCT Filed: Mar. 26, 2018

(86) PCT No.: PCT/US2018/024284
§ 371 (c)(1),
(2) Date: Sep. 4, 2020

(87) PCT Pub. No.: WO2019/190450
PCT Pub. Date: Oct. 3, 2019

(65) Prior Publication Data
US 2021/0003451 A1    Jan. 7, 2021

(51) Int. Cl.
*G01J 3/46* (2006.01)
*G01J 3/50* (2006.01)
(Continued)

(52) U.S. Cl.
CPC .............. *G01J 3/462* (2013.01); *G01J 3/00* (2013.01); *G01J 3/46* (2013.01); *G01J 3/50* (2013.01);
(Continued)

(58) Field of Classification Search
CPC ...... G01J 3/462; G01J 3/00; G01J 3/46; G01J 3/50; G01J 5/0846; G01J 3/463;
(Continued)

(56) References Cited

U.S. PATENT DOCUMENTS 6,459,425 B1 * 10/2002 Holub ................. G06T 5/005
                                                                    348/253
7,499,164 B2    3/2009 Pawlanta et al.
(Continued)

FOREIGN PATENT DOCUMENTS

WO    WO-2006135834    12/2006
WO    WO-2011071708     6/2011

*Primary Examiner* — Abdullahi Nur
(74) *Attorney, Agent, or Firm* — HP Inc. Patent Department

(57) ABSTRACT

Certain examples relate to emulating a spectral measurement device in a color measurement apparatus. In these examples, a primary spectral measurement device measures a first spectral characteristic of a rendered color output. A predictive model, parametrized by parameter values, is applied to the measurement from the primary spectral measurement device to determine a predicted measurement of a second spectral characteristic of the rendered color output which would be measured by an ancillary spectral measurement device. Parameter values are generated by training the predictive model with data from the primary spectral measurement device and the ancillary spectral measurement device.

15 Claims, 7 Drawing Sheets

(51) Int. Cl.
*G01J 5/08*   (2022.01)
*G01J 3/00*   (2006.01)
G01J 3/28    (2006.01)
G01J 3/52    (2006.01)

(52) U.S. Cl.
CPC ............. *G01J 5/0846* (2013.01); *G01J 3/463* (2013.01); *G01J 3/524* (2013.01); *G01J 2003/283* (2013.01); *G01J 2003/467* (2013.01)

(58) Field of Classification Search
CPC ................ G01J 3/524; G01J 2003/283; G01J 2003/467; H04N 1/60
See application file for complete search history.

(56) References Cited

U.S. PATENT DOCUMENTS

| | | |
|---|---|---|
| 7,864,320 B2 | 1/2011 | Bonino et al. |
| 7,982,873 B2 | 7/2011 | Klassen |
| 8,520,255 B2 | 8/2013 | Kaiser |
| 8,736,841 B1 | 5/2014 | Xu et al. |
| 9,200,963 B2 | 12/2015 | Xu et al. |
| 9,809,035 B2 | 11/2017 | Ochs |
| 9,851,928 B2 | 12/2017 | Amit et al. |
| 2005/0083540 A1 | 4/2005 | Hersch et al. |
| 2009/0009766 A1 | 1/2009 | Bonino et al. |
| 2012/0296595 A1 | 11/2012 | Dalal et al. |
| 2017/0085852 A1 | 3/2017 | Holub |

\* cited by examiner

EMULATING A SPECTRAL MEASUREMENT DEVICE

BACKGROUND

It is an object of color rendering devices to match rendered color outputs with defined input colors. This matching is performed while working within the constraints of the physical hardware available to the color rendering devices. To calibrate a color rendering device, rendered color outputs may be measured by sensors, such as sensors mounted within in the device. These measured color outputs may be then used to calibrate the color rendering device by comparing a measured color with input data used to produce the rendered color output. One way of defining colors is by measuring their spectral response. A spectral response may be measured using any spectroscopic method that involves measuring electromagnetic radiation intensity values over a range of wavelengths, where the intensity values may correspond to emitted or reflected light. In this context, the range of wavelengths of electromagnetic radiation over which visible colors may be measured corresponds to a range or around 400 nm to 700 nm. Intensity values outside this range may also be measured for certain implementations, e.g. ultra-violet or infra-red intensity values for security features or encodings. Different spectral measurement devices may be provided to measure different spectral characteristics. Typically, calibration is performed in a controlled laboratory environment using test devices. Calibration data may then be provided to individual color rendering devices, e.g. in the form of color profiles or firmware settings.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Certain examples described herein address a challenge of measuring colors with spectral measurement devices. These examples may be used where the demands of spectral measurement for measuring colors increases but spectral measurement devices are limited in availability. Described examples may be used to enhance a functionality of a fixed-specification spectral measurement device, e.g. such as a device built into a manufactured color rendering device.

Certain examples described herein make use of a primary spectral measurement device to measure a spectral characteristic of a rendered color output. This measurement may then be processed using an emulator to produce a predicted spectral measurement associated with an ancillary spectral measurement device. The predicted spectral measurement may exhibit spectral features which are not detectable by the primary spectral measurement device. For example, the predicted spectral measurement may comprise a spectral response over a wider range of wavelengths than the primary spectral measurement device is able to measure and/or the predicted spectral measurement may relate to a different measured variable over a range of wavelengths, such as providing predicted emittance values based on measured reflectance values.

Certain examples described herein make use of parameter values generated by training a predictive model on training samples. These parameter values may parameterize a predictive model that enables an output of the ancillary spectral measurement device to be predicted. The predictive model may be applied to an input array of values to generate an output array of values. The parameter values may be generated by training the predictive model using training samples generated from measurement of a rendered color output with the primary and the ancillary spectral measurement devices.

Figure 1:
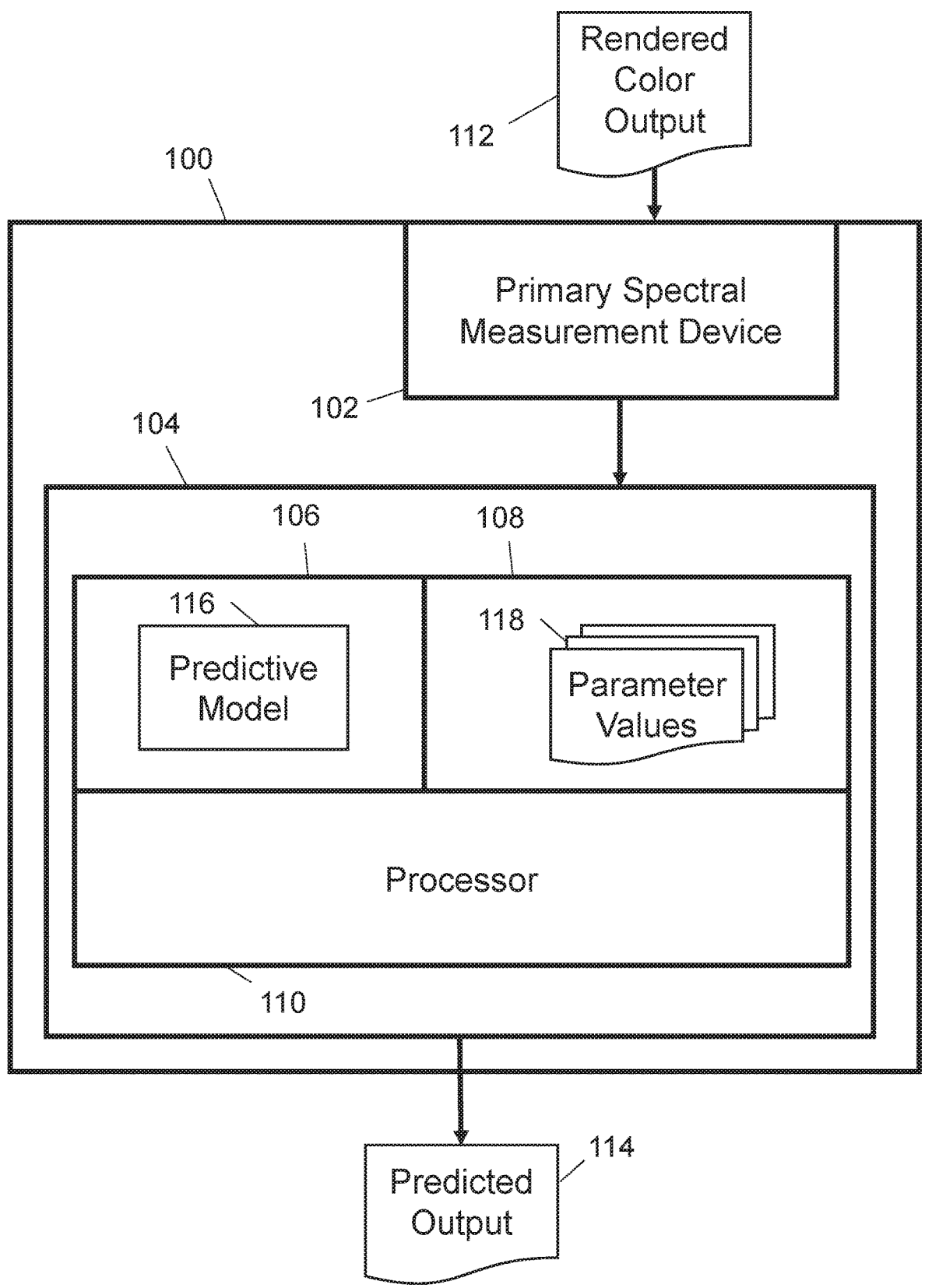
FIG. 1 is a schematic illustration of an apparatus for color measurement according to an example.

FIG. 1 shows an apparatus for color measurement 100 according to an example. The apparatus 100 comprises a primary spectral measurement device 102 to measure a first spectral characteristic of a rendered color output 112 and to output an array of values corresponding to a range of wavelengths. The primary spectral measurement device 102 may be any type of spectroscopic sensor which is capable of measuring a spectral characteristic, e.g. a spectral property over a range of wavelengths. The spectral property may be a detected emittance and/or reflectance value. A measurement device may be called a sensor, a tool, a detector, or any equivalent term. In some, examples a primary spectral measurement device 102 is configured to measure a spectral property of a rendered color output 112 in a visible range, e.g. between 400 nm and 700 nm. The primary spectral measurement device 102 may output an array of values having a spectral resolution, e.g. covering the range 400-700 nm in 20 nm intervals, such that the array of measured values has 15 entries. A spectral characteristic to be measured may be defined based on a number including: a range of wavelengths over which the spectral response is measured; a wavelength interval between sequential measurements (i.e. an output resolution); the spectral property being measured; and/or a technique or detector type used in the spectral measurements. A spectral measurement technique or detector type that defines a spectral characteristic may further be characterized by: a set of applied filters; an application of illumination to a target of the measurement; a type of sensor used; an inclusion of a set of optical elements within the spectral measurement device; and/or any other controlled variable that may affect the result of the measurement of the spectral measurement device.

The rendered color output 112 comprises at least one color which is measurable by spectral analysis. In some examples, the rendered color output 112 represents an output from a color rendering device, where the rendered color output 112 comprises colors which are to be measured by the color measurement apparatus 100. A rendered color output 112 may be an output from a printing process or system for example, an inkjet printer, an electrophotographic printer, a color-capable 3D printer, and/or a textile printing process. In other examples, a rendered color output 112 may comprise an image formed on a screen or monitor In the example of FIG. 1, the color measurement apparatus 100 comprises an emulator 104 for an ancillary spectral measurement device. The ancillary spectral measurement device is a spectral measurement device which measures a second spectral characteristic of a rendered color output 112 and outputs an array of values corresponding to a range of wavelengths. The emulator 104 is configured to receive data indicative of a measurement of the first spectral characteristic of the rendered color output 112, e.g. as output by the primary spectral measurement device 102, and to generate a prediction of a measurement of the second spectral characteristic of the rendered color output 112, e.g. to emulate an output from the ancillary spectral measurement. The emulator 104 may receive the output of the primary spectral measurement device 102 in the form of an array of values corresponding to a range of wavelengths. In other implementations, the emulator 104 may receive unprocessed electrical signals from the primary spectral measurement device 102 (e.g. voltage or current signals).

In the example of FIG. 1, the emulator 104 comprises a first storage medium 106 storing computer program code to implement a predictive model 116. In examples where the emulator 104 receives unprocessed electrical signals from the primary spectral measurement device 102, the emulator 104 may process these before application of the predictive model 116. The processing of these electrical signals may involve converting the signals into numeric values and storing these values in a data structure such as an array. The emulator 104 may perform pre-processing of data before, and/or post-processing of data after, the application of the predictive model 116 to the output of the primary spectral measurement device 102. Processing of data may be for example, normalization, factorization, conversion of data storage types from, or to, arrays, or any other function so that the predictive model can be applied.

The emulator 104 may be implemented as any combination of hardware or programming configured to perform the functionality described herein. A storage medium may be a non-transitory computer-readable storage medium for example, a hard drive, a CD-ROM disc, a USB-drive, a solid-state drive or any other form of magnetic storage device, optical storage device, or flash memory device, maintained locally or accessed remotely, capable of having thereon computer readable code suitable for the function described herein.

The predictive model 116 maps an input array of values to an output array of values. The input array of values may be an array of measured values corresponding to a range of wavelengths from the primary spectral measurement device 102 and the output array of values may be a prediction of an array of values corresponding to a range of wavelengths, which would be produced by an ancillary spectral measurement device. The range of wavelengths for the input array and the range of wavelengths for the output array may be the same or different, e.g. the two arrays may have a common length where each entry corresponds to a particular wavelength or the two arrays may have different lengths and/or different wavelength-to-entry mappings. The predictive model 116 may generate an output array by implementing a machine learning architecture, for example, an architecture comprising one or more of: support vector machines, linear regression, neural networks or any other techniques suitable for use in a supervised learning environment. The predictive model 116 may be implemented in a high-level programming language for example, Java, C++, Python, Scala, or any other suitable language. The predictive model 116 may be implemented via a defined architecture, e.g. in computer program code, that uses functions implemented in a machine learning library, e.g. a library of computer program code.

In the example of FIG. 1, the emulator 104 comprises a second storage medium 108 storing parameter values 118. The parameter values 118 are generated by training the predictive model 116 on a set of training samples. Each training sample relates to a measurement of a rendered color output such as rendered color output 112 and comprises data indicative of a measurement using the primary spectral measurement device 102 and data indicative of a measurement using an ancillary spectral measurement device, the ancillary spectral measurement device measuring a second spectral characteristic that differs from the first spectral characteristic obtained by the primary spectral measurement device 102. A spectral characteristic may comprise measured quantities or a set of measurements over a range of wavelengths that are dependent on the spectral measuring device used to measure said characteristic. The first and second spectral characteristic comprise measured quantities over the range of wavelengths that are dependent on respective differing detectors of the primary and ancillary spectral measurement device. The first and second storage medium 108 may be the same storage medium. Alternatively, the first and second storage medium 108 may be separate storage mediums and may operate independently from each another. In some examples it is desired to have the first and second storage medium 108 maintained as two separate storage mediums. For example, the first storage medium 106 comprising computer program code to implement a predictive model 116 may be stored remotely from color measurement apparatus 100, for example in a cloud-based storage system, allowing the predictive model 116 to be modified and updated remotely by responsible personal. The parameter values which are specific to the training of the predictive model 116 on training samples available to the color measurement apparatus 100 may be stored locally and updated with training samples measured by the color measurement apparatus 100 and an ancillary spectral measurement device. Alternatively, the parameter values 118 may be stored externally to the color measurement apparatus 100 for example, where available ancillary measurement devices and processing power for generating the parameter values 118 is located externally to the color measurement apparatus 100.

In the example of FIG. 1, the emulator 104 comprises a processor 110 to execute the computer program code of the predictive model 116 as stored within the first storage medium 106 to implement the predictive model 116, where the predictive model is parameterized with the parameter values 118 from the second storage medium 108. In use, the execution of the computer program code by the processor 110, applies the predictive model 116 to an output of the primary spectral measurement 112 device to generate a predicted output 114 of an ancillary spectral measurement device. The processor 100 may be a standard central or graphical processing unit (CPU or GPU), or a custom processing unit designed for the purposes described herein, or any other type of processor which is capable of performing the functions described herein. In certain cases, multiple processors may be provided, wherein each processor may have multiple processing cores.

The apparatus for color measurement 100 shown in FIG. 1 may be used in color rendering systems. Color rendering systems may be two-dimensional or three-dimensional printing systems which produce outputs comprising at least one color. Alternatively, a color rendering system may be a manufacturing system producing objects with defined colors, or a monitor to display images or videos. Color rendering systems may comprise a color rendering device and a combination of external hardware and program code which may be used to calibrate the color rendering device.

Figure 2:
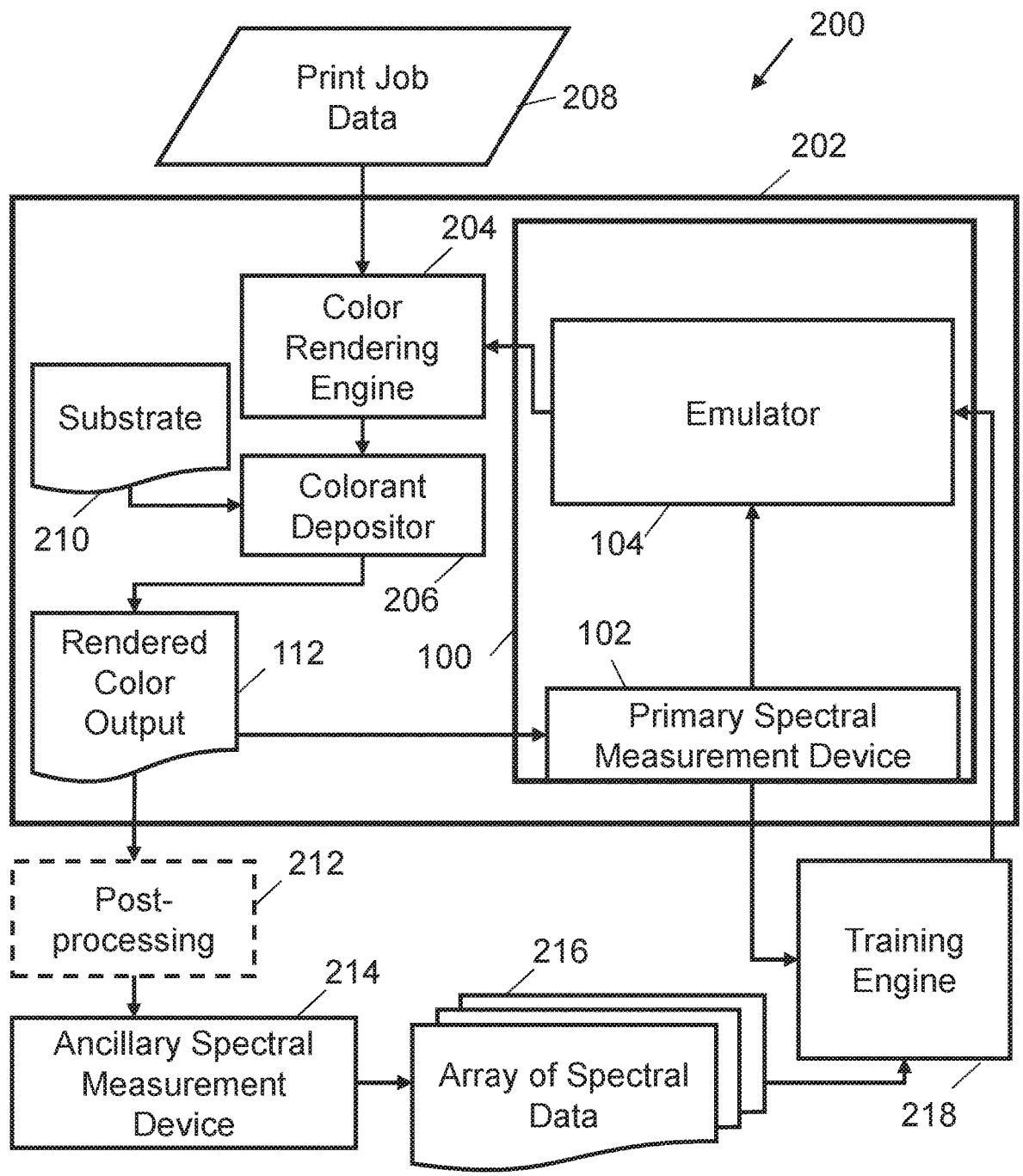
FIG. 2 is a schematic illustration of a color rendering system which comprises a color measurement apparatus according to an example.

An implementation of an apparatus for color measurement 100, according to examples, in a color rendering system is shown in FIG. 2. The example of FIG. 2, shows how the apparatus 100 may be used in a color rendering system 200, and also shows how the emulator 104 may be configured with appropriate training data. It should be noted that certain components of FIG. 2 may be omitted for certain implementations, e.g. the components used to train the emulator 104 may be used in a laboratory setting and an on-site color rendering system 200 may not include these components.

According to the example of FIG. 2, the color rendering system 200 has a color rendering device 202. The color rendering device 202 may be a color printer. A color rendering engine 204 of the color rendering device 202 receives print job data 208 and generates instructions for a colorant depositor 206 to produce a rendered color output 112 by depositing colorant onto a substrate 210. Print job data 208 is data indicative of a print job which may comprise image data encoded with color information for rendering the image by the color rendering device 202. The print job data 208 may be input to the color rendering device 202 via an external computer or input directly at a user interface of the color rendering device. A substrate 210 may be any material which may receive colorant such as, paper, polymers, fabrics, or any other suitable materials. In some implementations, the color rendering engine 204 accesses color definitions, stored on a computer-readable storage medium, which relate colorants available to the colorant depositor 206 to the color information of the print job data 208, and generates instructions for the colorant depositor 206 to deposit colorant to create a rendered color output 112 according to the print job data 208. The color definitions may be stored within the color rendering engine 204 or may be stored externally to the color rendering engine 204. A color rendering engine 204 may be any combination of hardware or computer program code configured to perform the function described herein. For example, the color rendering engine 204 may comprise an embedded processor of a printer. The colorant depositor 206, according to an example of FIG. 2 is a combination of hardware and computer program code which, upon receiving instructions from the color rendering engine 204 deposits colorant onto a substrate 210 to generate a rendered color output 112. In a color printing system, the colorant depositor 206 may comprise a print head comprising ink-depositing nozzles to direct ink onto the substrate 210 at predetermined positions and in predetermined quantities. In other examples of color rendering devices, a colorant may be a dye, a pigment, an ink, a combination of inks, a light source, or any material or agent which has a defined color and may be used alone or in combination with other colorants to produce a color to be measured by the primary spectral measurement device 102.

In the example of FIG. 2, a first spectral characteristic of the rendered color output 112 is measured by the primary spectral measurement device 102 which outputs an array of values corresponding to a range of wavelengths. The array of values output from the primary spectral measurement device 102 may be a single or a multidimensional array comprising spectral information for a range of wavelengths for each color measurable by the primary spectral measurement device 102. The array of values output from the primary spectral measurement device 102 is received by the emulator 104 which performs the function described above and generates a predicted output 114 of an ancillary spectral measurement device. In some implementations, the primary spectral measurement device 102 is a spectrophotometer. The primary spectral measurement device 102 may be capable of measuring spectral reflectance values over a range of wavelengths. An example of a range of wavelengths common to spectrophotometers available in color rendering devices is between 400 nm and 700 nm.

Figure 3:
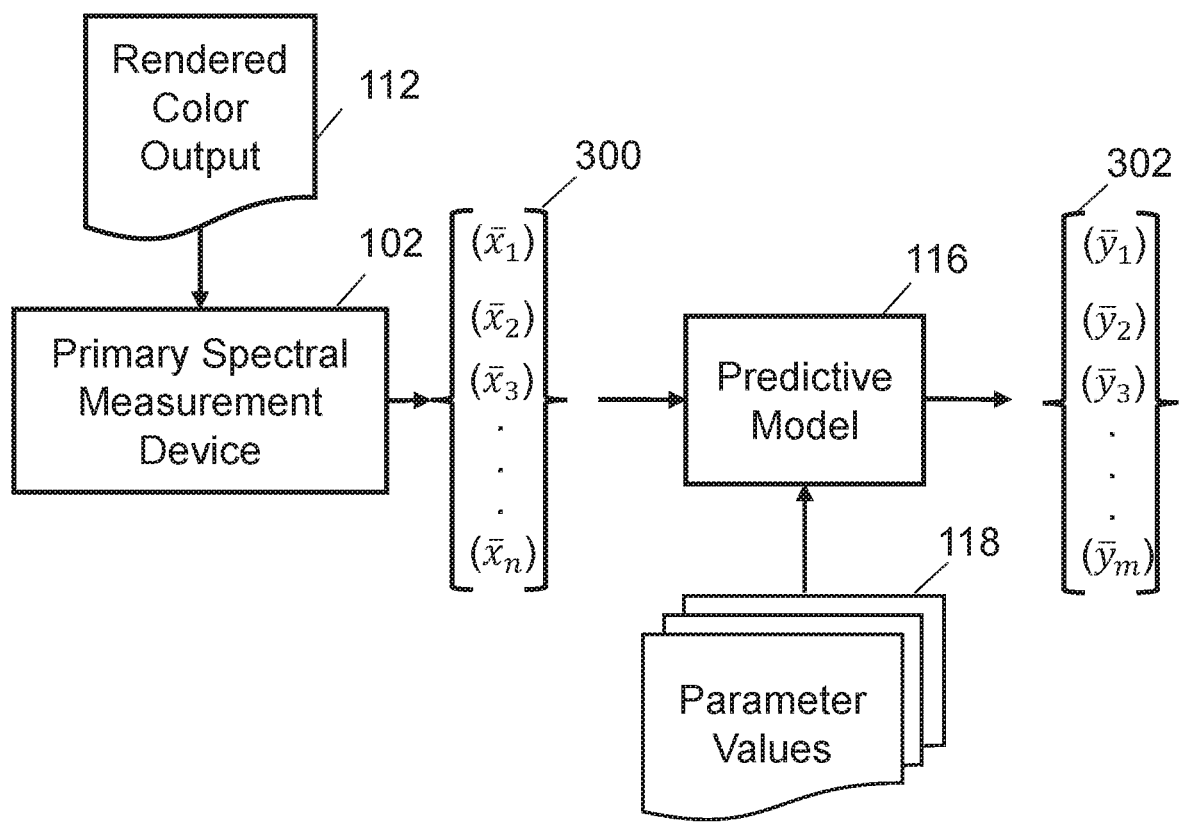
FIG. 3 is a schematic illustration showing a system for generating a spectral prediction according to an example.

FIG. 3 shows a process that may be implemented by a primary spectral measurement device 102 according to an example. In FIG. 3, the primary spectral measurement device 102 measures a first spectral characteristic of a rendered color output 112. The primary spectral measurement device 102 outputs an array of values 300 corresponding to a range of wavelengths. For example, if the primary spectral measurement device 102 comprises a spectrophotometer, the array of values may comprise a set of 15 normalized reflectance measurements for 20 nm wavelength portions between 400 nm and 700 nm. The values in the array may be in a defined range, such as between 0 and 1 for normalized reflectance values representing 0% to 100% reflected light. In some implementations, the primary spectral measurement device 102 may output an array of values 300 corresponding to a range of wavelengths for each color of the rendered color output 112. In other implementations, an array may be output for each of a subset of the defined colors of the rendered color output 112.

In FIG. 3, the predictive model 116, parameterized by the parameter values 118, is applied to the array of values 300 output from the primary spectral measurement device 102 to generate a predicted output of an ancillary spectral measurement device. In FIG. 3, the predicted output is in the form of an array of values 302 corresponding to a range of wavelengths. The predicted array of values 302 may have more elements than the array of values 300. This may be the case when for example, the predictive model 116 is generating a prediction of an ancillary spectral measurement device that measures a spectral response over a broader range of wavelengths than the primary spectral measurement device 102, or at a higher sample rate than the primary spectral measurement device 102.

Returning to FIG. 2, in this example, the predicted output of the ancillary spectral measurement device from the emulator 104 is received by the color rendering engine 204. The color rendering engine 204 may use the predicted output 114 to calibrate/update the color definitions, e.g. as if the color rendering engine 204 had access to the ancillary spectral measurement device.

The example of FIG. 2 also shows certain components that may be used to train the emulator 104. For example, the predictive model 116 as shown in FIGS. 1 and 3 may be trained or updated based on the color rendering capabilities of the color rendering device 202. To achieve this, the color rendering engine 204 receives print data 208 that instructs the rendering of a number of test patches. For example, print data 208 in this case may be data comprising image data comprising color information spanning a color gamut of the color rendering device 202 (or at least a desired sample of the color gamut). When rendered, the print data 208 may include a range of colors that the colorant depositor 206 is capable of producing on available substrates of the color rendering device 202.

When training the emulator 104, the color rendering engine 204 generates colorant depositor instructions based on the received print job data 208. The colorant depositor 206 generates a set of color test patches by depositing colorant onto a substrate 210 based on received colorant depositor instructions. A set of color test patches rendered on a substrate 210 may be called a rendered color test. The primary spectral measurement device 102 measures a first spectral characteristic of the rendered color test and the data indicative of the first spectral characteristic is sent to be used by a training engine 218 to in train the predictive model 116. In this training case, an ancillary spectral measurement device 214 measures a second spectral characteristic of the rendered color test and outputs an array of spectral data 216 which is sent to the training engine 218 to be used in training the emulator 104. The ancillary spectral measurement device 214 may be any type of spectroscopic sensor which is capable of measuring a spectral property over a range of wavelengths. The ancillary spectral measurement device 214 may be a spectrophotometer wherein the second spectral characteristic differs from the first spectral characteristic. For example, the ancillary spectral measurement device 214 may measure a spectral response over a range of wavelengths which differs from the primary spectral measurement device 102. In some examples, the primary device has a range of 400 nm to 700 nm and the ancillary device has a range of 380 nm to 730 nm. The ancillary spectral measurement device 214 may have a smaller wavelength interval than the primary spectral measurement device 102 for example, 10 nm. The ancillary spectral measurement device 214 may include or omit Ultra-Violet (UV) filters that are respectively omitted or included in the primary spectral measurement device 112, such that it can perform spectroscopic measurements with spectroscopic features due to UV radiation included, isolated, or removed. This may be advantageous when trying to isolate spectral features which are associated with UV radiation that need to be removed for measurements by the primary spectral measurement device 112. In some examples the ancillary spectral measurement device 214 is a spectroradiometer. In examples where the ancillary spectral measurement device 214 is spectroradiometer, the spectral property measured by the ancillary spectral measurement device 214 may be irradiance. Measurements of irradiance may be normalized, converted or altered in a suitable manner before being used to train the predictive model 116.

In training configurations, the training engine 218 generates a set of training samples by pairing measurements of the first and second spectral characteristic, for the rendered color test, from the primary spectral measurement device 102 and the ancillary spectral measurement device 214 respectively. The predictive model 116 of the emulator 104 is trained using the set of training samples, wherein data indicative of a measurement of the first spectral characteristic is used as an input for the predictive model 116 and data indicative of a measurement of the second spectral characteristic is used as a ground truth output for the predictive model 116. The training model may generate parameter values which are accessed by the emulator 104 during a prediction to parameterize the predictive model 116. The training of the predictive model 116 may be implemented in any combination of hardware or programming code. Some or all of the training engine 218 functionality may be performed by one or more parts of the color rendering system 200 for example, the emulator 104; or this may be provided by a separate component. In one case, components 212 to 218 are not provided with the color rendering system 202. In this case, training may occur at a remote site and parameter values generated during training may be supplied to multiple on-site implementations of the color rendering system 202. In another case, the components 212 to 218 may be provided and utilized during an installation of the color rendering system 202, such that for subsequent operation these components are not present. This then allows the color rendering system 202 to operate as if the ancillary spectral measurement device 214 is provided, i.e. via the emulator 104, despite the ancillary spectral measurement device 214 not being present.

The data that is output from the primary spectral measurement device 102 and the data output from the ancillary spectral measurement device 214 may depend on properties of the rendered color test from which it is generated. Variables which affect this measurement may include: the type of substrate 210 on which the set of color test patches is rendered; the colorants used to render the set of color test patches onto the substrate 210; and/or any post-processing 212 applied to the rendered color test. Some substrates may comprise optical brighteners which affect the spectral response of the rendered color test. In certain cases, these factors may comprise additional input parameters to condition the predictive model 116.

The rendered color output 112 measured by the ancillary spectral measurement device 214, used to generate parameter values 118 by training the predictive model 116, may be a rendered color output 112 which is not a rendered color test. Any rendered color output 112 may be used to generate a training sample. However, it may be advantageous to use a rendered color test generated from test patch data as the test patch data may be designed to efficiently sample a color gamut which the color rendering device 202 is able to render. Rendered color test patches may also be advantageous where the desired training is of a subset of the full spectral data measured by the primary and ancillary spectral measurement devices. For example, using a rendered color output may be useful where the predictive model 116 is used to predict spectral features in a narrow range of a full wavelength range measurable by the primary spectral measurement device 102, where the spectral features are not measurable by the primary spectral measurement device 102. For example, where the primary spectral measurement device 102 is a spectrophotometer, the primary spectral measurement device 102 may not be configured to measure fluorescence. In examples where the color rendering device 202 is able to produce rendered color outputs which exhibit fluorescence, a rendered color test which has fluorescence may be measured to provide a first array of spectral data using the primary spectral measurement device 102 and a second array of spectral data 216 using the ancillary spectral measurement device 214, wherein the second array of spectral data 216 comprises data indicative of a detection of fluorescence that is not primarily measured by the primary spectral measurement device 102. For example, this may be achieved by using a spectroradiometer as the ancillary spectral measurement device 214. In this case, the parameter values generated by the training of the predictive model 116 using the first and second arrays of spectral data may be used to produce predictions of fluorescence in rendered color outputs where the input to said prediction comprises data from the rendered color output 112 measured using a primary spectral measurement device 102 which is incapable of measuring fluorescence.

Figure 4:
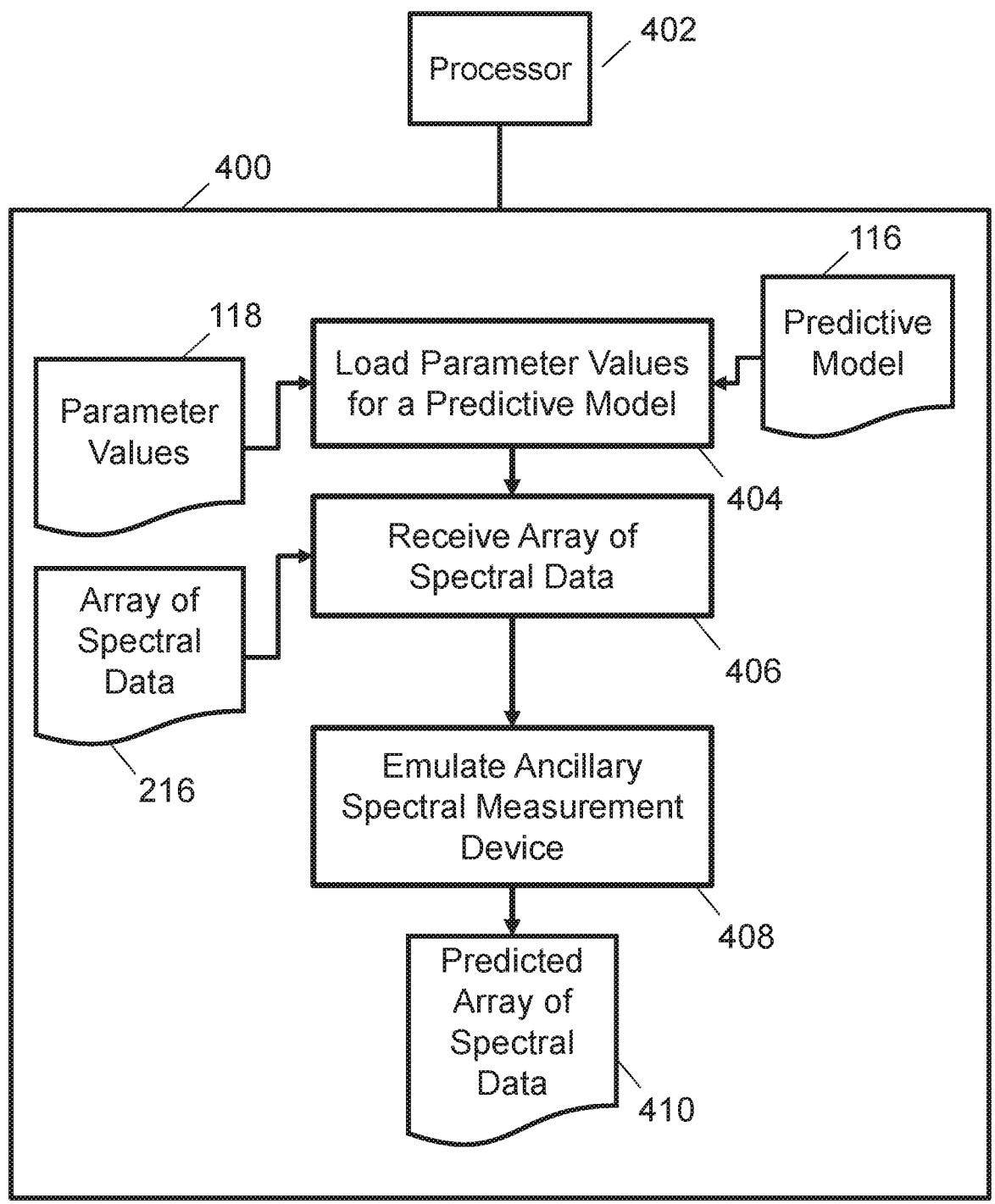
FIG. 4 is a schematic illustration of a non-transitory computer-readable storage medium according to an example.

FIG. 4 shows a schematic illustration of a non-transitory computer readable storage medium 400 according to an example. The storage medium 400 stores instructions which when executed by a processor 402 cause the processor to perform the blocks of FIG. 4. At block 404, the processor loads parameter values for a predictive model 116 which maps a first array of spectral data to a second array of spectral data, the parameter values resulting from training the predictive model 116 on a set of training samples, each training sample relating to a measurement of a rendered color output 112, each training sample comprising data indicative of a measurement using a primary spectral measurement device 102 and data indicative of a measurement using an ancillary spectral measurement device 214, the ancillary spectral measurement device 214 measuring a spectral characteristic that differs from the first spectral characteristic. At block 406, the processor receives an array of spectral data from a primary spectral measurement device 102, the array of spectral data relating to a measurement of a rendered color output 112 by the primary spectral measurement device 102. At block 408, the processor emulates the ancillary spectral measurement device 214 by applying the predictive model 116 with the loaded parameter values to the received array of spectral data to output a predicted array of spectral data 410 for the ancillary spectral measurement device 214. The predicted array of spectral data 410 is thus generated using data from the primary spectral measurement device 102 and the ancillary spectral measurement device 214 is not used, e.g. a functionality of the primary spectral measurement device 102 may be extended via the predictive model 116 to emulate the ancillary spectral measurement device 214. This enables a functionality of a built-in spectral measurement device, e.g. as supplied in a manufactured color rendering device, to be extended without installing additional hardware, e.g. without installing an ancillary spectral measurement device.

The computer readable storage medium 400 according to the example of FIG. 4 may be part of the first storage medium 106 or the second storage medium 108 shown in the example of FIG. 1. Alternatively, the computer readable storage medium of FIG. 4 may be stored in a separate storage medium which may be part of the emulator 104 or another part of the color measurement apparatus 100 according to FIG. 1.

The computer readable storage medium 400, according to certain examples, may also store instructions that, when executed by the processor 402, cause the processor 402 to calibrate a color rendering engine based on the predicted array of spectral data. The color rendering engine may be a color rendering engine 204 such as that in FIG. 2. The color rendering engine may update color definitions by comparing the spectral measurements of a rendered color output 112 from the color rendering device 202 with the received job data used to generate the rendered color output.

The computer readable storage medium 400 according to the example of FIG. 4 may store instructions that, when executed by the processor 402, cause the processor 402 to obtain target prediction parameters, wherein the parameter values 118 that are loaded may be dependent on the target prediction parameters. The target prediction parameters may be used to determine the parameters values 118 which are used to parameterize the predictive model based on the desired prediction and input data. In certain examples, the parameter values which are generated via the operation of the training engine 218 are dependent on the target prediction parameters. For example, different parameter values may be generated for rendered color outputs which are rendered on different substrates, or different parameter values may be generated based on different ancillary spectral measurement device that are used to generate the training samples. In this case, different sets of parameter values may be retrieved based on different supplied target prediction parameters.

Target prediction parameters may comprise information related to the ancillary spectral measurement device 214. For example, the target prediction parameters may indicate a first ancillary spectral measurement device or a second ancillary spectral measurement device, wherein each ancillary spectral measurement device measures a different spectral characteristic that is not measurable with the primary spectral measurement device, and wherein each ancillary spectral measurement device has a different set of trained parameter values.

In certain cases, instead of or as well as different parameter value sets, there may be a common set of trained parameter values where the target prediction parameters are fed as an input to the predictive model, e.g. by concatenating to the spectral data from the primary spectral measurement device, to condition the predictive model to output a particular output array. For example, the same target prediction parameters may be supplied as part of the input training data. The target prediction parameters may comprise information related to the rendered color output, such as: a substrate type, an illuminant used for the primary spectral measurement device, and/or identifiers for colorants that are used to produce the rendered color output. The target prediction parameters may also comprise information about post-processing applied to the rendered color output, or any other information that may be used to condition the predictive model. Post processing may involve lamination, calendaring, applying filters, applying coats of protective agents or glosses, or any process which may change the spectral response of a rendered color output. Post-processing is shown as block 212 in FIG. 1.

In some examples, the computer readable storage medium may store instructions which, cause the processor 402 to train the emulator, i.e. train the predictive model used by the emulator. This may comprise instructions to cause the processor 402 to obtain data indicative of a first spectral characteristic for a set of color test patches measured using a primary spectral measurement device and data indicative of a second spectral characteristic for the set of color test patches measured using an ancillary spectral measurement device. Based on this obtained data, the processor 402 may be instructed to generate a set of training samples by pairing measurements of the first and second spectral characteristic for the color test patches within the obtained data. These training samples may be used to train the predictive model. In this case, data indicative of a measurement of the first spectral characteristic may be used as an input for the predictive model and data indicative of a measurement of the second spectral characteristic may be used as a ground truth or target output for the predictive model. Training as described herein may use any suitable optimization technique. In certain cases, training makes use of back-propagation and stochastic gradient descent to determine the parameter values. Via the training procedure, data indicative of the parameter values for the predictive model is output.

In certain cases, during training, the measurement of the color test patches using the ancillary spectral measurement device may be performed under a different illuminant to the measurement of the color test patches using the primary spectral measurement device. For example, the ancillary spectral measurement device may be used to measure the color test patches under CIE (International Commission on Illumination) illuminant D50. The illuminant chosen may be used based on a target for the prediction. For example, CIE illuminant D50 may mimic the conditions under which the rendered color output will be viewed and so training a predictive model under this condition may allow a color rendering system to accurately predict the appearance of rendered colors in the conditions in which they will be viewed.

Figure 5:
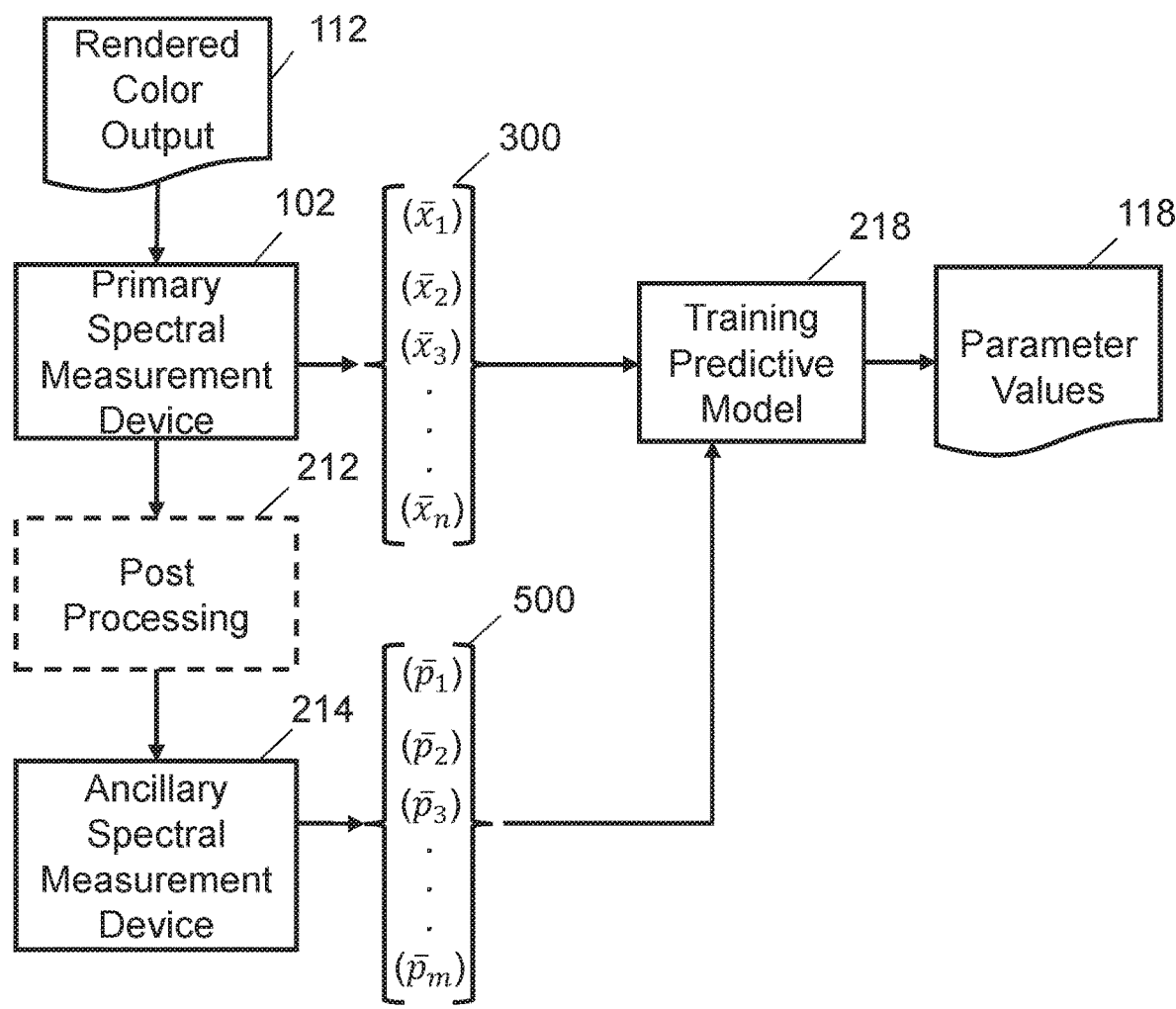
FIG. 5 is a schematic illustration of a process for training a predictive model according to an example.

FIG. 5 is schematic illustration of an example process used to train the predictive model 116 and generate parameter values. This example process may be performed in an online or offline capacity, e.g. may be performed periodically on a particular color rendering system (online) or may be performed remotely from an installed color rendering system (offline) wherein the parameter values 118 are communicated to the installed color rendering system. A first spectral characteristic of a rendered color output 112 is measured by the primary spectral measurement which outputs an array of values 300 corresponding to a range of wavelengths. The array of values 300 may comprise vector or multidimensional values. The size of the array 300 and the data contained within it are dependent on the first spectral characteristic measured by the primary spectral measurement device 102. For example, the first spectral characteristic may comprise a measurement of spectral reflectance of the rendered color output 112 over a wavelength range of 400 nm to 700 nm at intervals of 20 nm, wherein each value in the array comprises at least a spectral reflectance value associated with a wavelength value, where the total number of values in the array is 15 (15 measurements of reflectance between 400 nm and 700 nm in intervals of 20 nm).

A second spectral characteristic of the rendered color output 112 is then measured using the ancillary spectral measurement device 214. The array of values 500 corresponding to the output from the ancillary spectral measurement device 214 may be of a similar format to the array of values 300, but may have a different length or dimension. The arrays 300 and 500 may have different measurement ranges for each entry, although training performance may be improved by using normalized values. The size of each array, the type of data stored in each array, and/or the dimensionality of the data stored in each array may be dependent on the spectral characteristics measured by the spectral measurement devices.

In some examples, after the first spectral characteristic is measured by the primary spectral measurement device 102, the rendered color output 112 may undergo post-processing 212, such as lamination, before the second spectral characteristic is measured by the ancillary spectral measurement device 214. This may be the case in examples where a color rendering device 202 is a printer and the primary spectral measurement device 102 is embedded within the color rendering device 202. Where rendered color outputs 112 are to be post processed, the final appearance may be modified after the primary spectral measurement device 102 has measured the rendered color output 112. It may be an objective in this case to measure a spectral characteristic of the rendered color output 112 after post-processing 212 so that the predicted output, produced by the predictive model 116 when applied to data output from the primary spectral measurement device 102, may be used to calibrate the printing system to account for the final appearance, after post-processing 212, of the rendered color output 112.

The first array of spectral data and the second array of spectral data 216 are then used to generate training samples which are used in training the predictive model 116, outputting parameter values 118 which are used to parameterize the predictive model 116.

Figure 6:
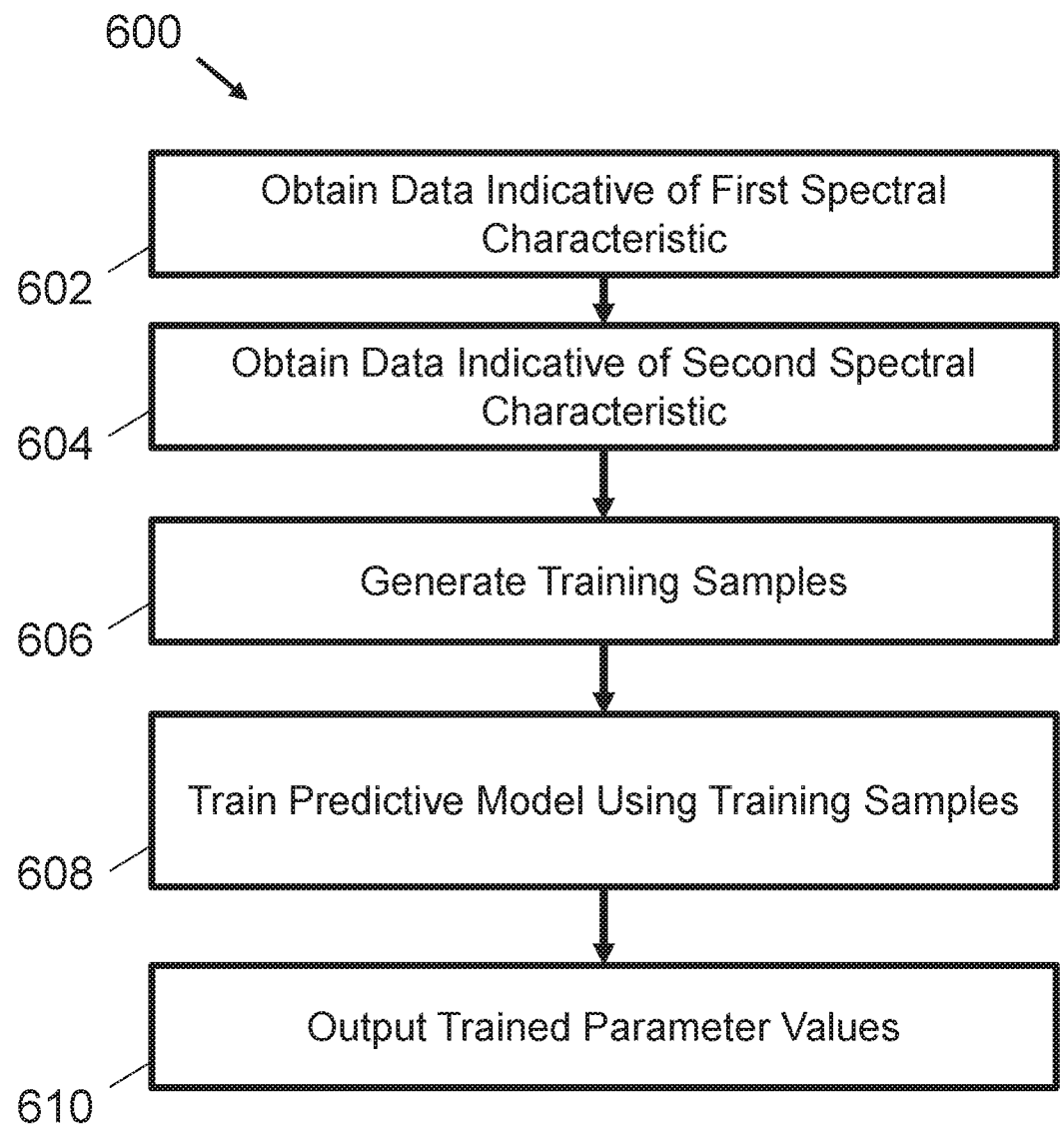
FIG. 6 is a flow chart for a method of training a predictive model according to an example.

FIG. 6 shows a method 600 of training a predictive model which maps an output from a primary spectral measurement device to a predicted output from an ancillary spectral measurement device. The method 600 may be performed in association with apparatus 100 of FIG. 1 or elsewhere in a color rendering system 200 as shown in FIG. 2. The method may be performed to calibrate an emulator such as emulator 104 in the examples of FIGS. 1 and 2. The method 600 may be performed by an entity that is different to the entity that controls the apparatus 100 or the color rendering device 202, e.g. the apparatus 100 or the color rendering device 202 in other examples may be provided by pre-generated parameter values 118 without explicitly performing the method 600 themselves. Additionally, different parts of the method 600 may be performed by different components of a color rendering device or color measurement apparatus.

At a first block 602, the method 600 comprises obtaining data indicative of a first spectral characteristic for a set of color test patches measured using a primary spectral measurement device, the color test patches having been rendered on a color rendering device. In examples according to FIG. 2, the color test patches may be rendered in a color rendering device 202 by receiving test patch data 208, generating colorant depositor instructions and depositing colorant onto a substrate 210 based on the colorant depositor instructions. The data indicative of a first spectral characteristic may be processed or unprocessed data and may be in the form of an array of values such as in examples according to FIG. 5. At a second block 604, the method 600 comprises obtaining data indicative of a second spectral characteristic for the set of color test patches measured using an ancillary spectral measurement device, the ancillary spectral measurement device performing a different spectroscopic measurement to the primary spectral measurement. A different spectroscopic measurement may mean a measurement over a different range of wavelengths, a different number of measurements within the range, a different measurement technique including the use of filters or different illuminants, the measurement of a different spectroscopic property or any other difference in measurement which would result in a different set of spectroscopic data to be produced following the measurement of the same color test patches.

At block 606, the method 600 comprises generating a set of training samples by pairing measurements of the first and second spectral characteristic for the color test patches within the obtained data. The training samples may be implemented in data structures which are suitable for training a predictive model. The predictive model may be configured by configuration parameters that specify a model architecture that is separate from the trained parameter values.

The following block 608 specifies training a predictive model using the set of training samples, wherein data indicative of a measurement of the first spectral characteristic is used as an input for the predictive model 116 and data indicative of a measurement of the second spectral characteristic is used as a ground truth output for the predictive model 116. The predictive model 116 is trained to map the measurements of the first spectral characteristic to measurements of the second spectral characteristic for future measurements of the first spectral characteristic of rendered color outputs. At block 610, the method 600 involves outputting data indicative of trained parameter values 118 for the predictive model 116, wherein a predictive model parametrized with the trained parameter values 118 is usable to emulate an output of the ancillary spectral measurement device 214 using data from the primary spectral measurement device 102. Although the blocks of the method 600 of FIG. 6 are shown sequentially it is understood that they may be performed in a different order than that described above. For example, data indicative of the second spectral characteristic may be obtained 604 before data indicative of the first spectral characteristic is obtained 602. In another example, after the data indicative of the first spectral characteristic is obtained at block 602, the method of generating training samples 606 may commence before the data indicative of the second spectral characteristic is obtained.

In one case, an ability of the predictive model 116 to accurately emulate an output of the ancillary spectral measurement device 214 is dependent on the degree of similarity between the conditions of the training of the predictive model 116 and the prediction which is to be made using the parameter values 118 which resulted from the training of the predictive model.

In color rendering systems 200, primary spectral measurement devices may be embedded within color rendering devices such that the conditions under which the primary spectral measurement device 102 measures a first spectral characteristic of a rendered color output is substantially consistent. In these cases, if a measurement by an ancillary spectral measurement device 214 of a second spectral characteristic of the same rendered color output is to be emulated accurately then the training samples used to generate the parameter values 118 of the predictive model 116 may be generated from color test patches which share properties with the rendered color output 112. For example, if the color test patches are rendered using colorants, or on substrates which are not used in the rendered color output 112 for which a prediction is made, then the prediction is unlikely to be accurate. In another example, if the rendered color output for which a prediction is generated undergoes post processing following the measurement of the first spectral characteristic by the primary spectral measurement device 102, but the training samples used to generate the parameter values parameterizing the predictive model were generated from a color test patch which did not undergo post processing before being measured by the ancillary spectral measurement device 214 then the prediction is likely to be inaccurate.

In some examples according to FIG. 6, post-processing 212 is applied to the set of color test patches before the second spectral characteristic is measured using the ancillary spectral measurement device 214. The data indicative of the second spectral characteristic may comprise spectral data representative of a measurement of fluorescence.

Figure 7A:
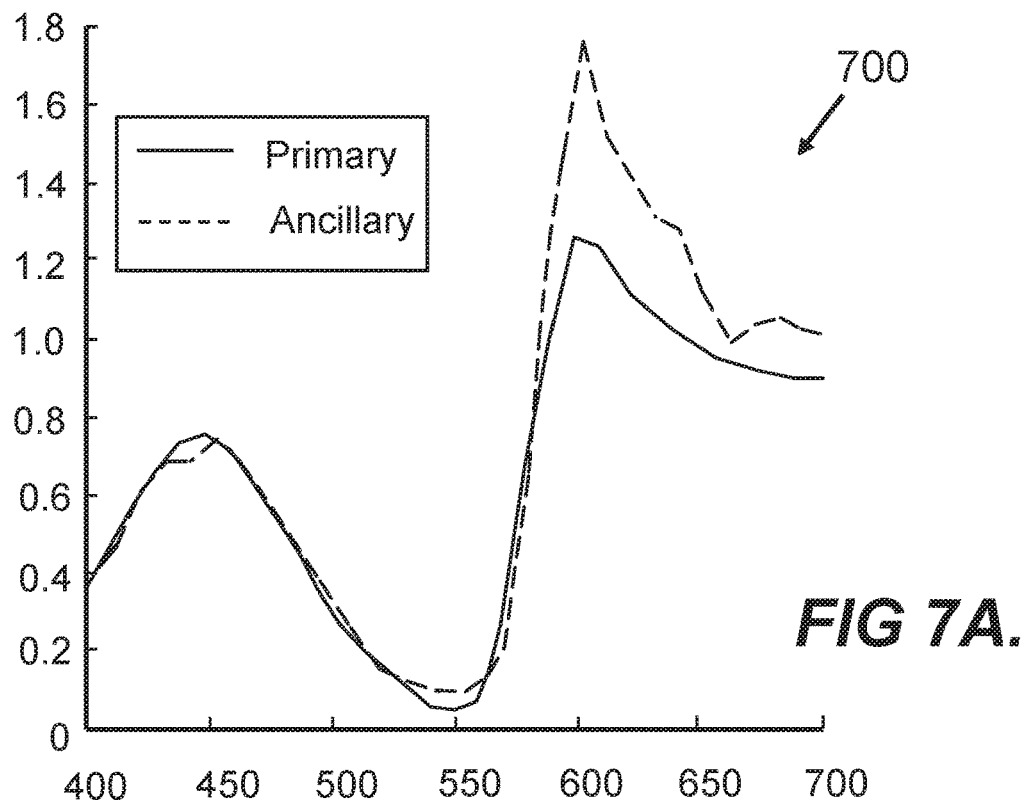
FIG. 7A is a chart showing data representative of measured spectral characteristics of rendered color output according to an example.

FIG. 7A shows data representative of a measurement of a first spectral characteristic measured using a primary spectral measurement device and data representative of a measurement of a second spectral characteristic measured using an ancillary spectral measurement device plotted on a graph 700. The y-axis of the graph represents a spectral value derived from the measurements of the spectral measurement devices. In some examples both the primary spectral measurement device and the ancillary spectral measurement device measure spectral reflectance. In other examples the primary spectral measurement device and the ancillary spectral measurement device measure different spectral properties and data representative of one or both of these measurements is processed such that the data output from the measurements using the primary spectral measurement device and ancillary spectral measurement device may be plotted on a single graph. It is clear from the graph 700 that the measurements from the different measurement devices are different.

In certain examples, the ancillary spectral measurement device may be a telespectroradiometer that is used to measure the irradiance of a color of a rendered color output under the illuminant CIE D50. A rendered color output may comprise a fluorescent pink. It is clear from the graph 700 that the ancillary spectral measurement device has detected a spectral feature at around 600 nm which the primary spectral measurement device has not been able to characterize.

A predictive model may be trained using data similar to that shown in graph 700 to generate parameter values that parametrize a predictive model, which may be used to generate a prediction of the output from the ancillary spectral measurement device.

Figure 7B:
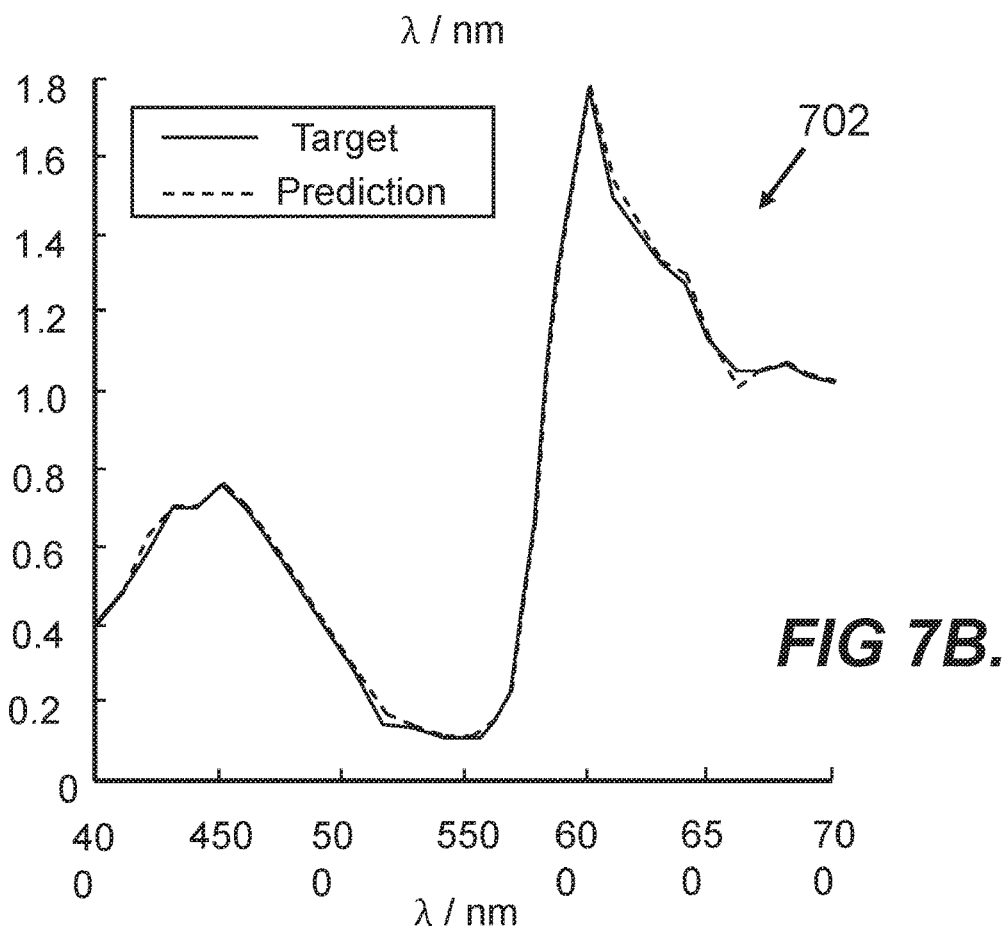
FIG. 7B is a chart showing data representative of measured and predicted spectral characteristics according to an example.

FIG. 7B shows a comparison of data representing an output from the ancillary spectral measurement (labelled as "target"), having measured a second spectral characteristic of the rendered color output, with data representing an output from a predictive mode applied according to examples ("prediction"). In this example, the predictive model is a second order polynomial regression model with interaction terms included. Interaction terms are included in this case as fluorescence is an effect of absorbing light at one wavelength and emitting it at another. As such there is a dependence on the interaction of light of different wavelengths. In example applications, for example extending sampling range or refining sampling accuracy, interactions between light of different wavelengths has a considerable effect and so the predictive model includes interaction terms.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples

What is claimed is:

1. An apparatus for color measurement comprising:
a primary spectral measurement device to measure a first spectral characteristic of a rendered color output and to output an array of values corresponding to a range of wavelengths;
an emulator for an ancillary spectral measurement device comprising:
a first storage medium storing computer program code to implement a predictive model, the predictive model mapping an input array of values to an output array of values,
a second storage medium storing parameter values for the predictive model, the parameter values being generated by training the predictive model on a set of training samples, each training sample relating to a measurement of a rendered color output, each training sample comprising data indicative of a measurement using the primary spectral measurement device and data indicative of a measurement using the ancillary spectral measurement device, the ancillary spectral measurement device measuring a second spectral characteristic that differs from the first spectral characteristic; and
a processor to execute the computer program code of the first storage medium to apply the predictive model as parameterized with the parameter values from the second storage medium to an output of the primary spectral measurement device to generate a predicted output of the ancillary spectral measurement device.

2. The apparatus of claim 1, wherein the first and second spectral characteristics comprise measured quantities over the range of wavelengths that are dependent on respective differing detectors of the primary and ancillary spectral measurement devices.

3. The apparatus of claim 1, wherein the primary spectral measurement device is one of a spectrophotometer and a spectroradiometer and the ancillary spectral measurement device is one of a spectrophotometer and a spectroradiometer.

4. The apparatus of claim 1, wherein the second spectral characteristic comprises spectral data representative of a measurement of at least one of the following:
 fluorescence;
 a spectral response over a range of wavelengths that differs from the first spectral characteristic;
 a spectral response with a wavelength interval that differs from the first spectral characteristic; and
 a spectral response measured with a spectral measurement technique that differs from the first spectral characteristic.

5. A non-transitory computer-readable storage medium storing instructions that, when executed by a processor, cause the processor to:
 load parameter values for a predictive model which maps a first array of spectral data to a second array of spectral data, the parameter values resulting from training the predictive model on a set of training samples, each training sample relating to a measurement of a rendered color output, each training sample comprising data indicative of a measurement using a primary spectral measurement device and data indicative of a measurement using an ancillary spectral measurement device, the ancillary spectral measurement device measuring a spectral characteristic that differs from the first spectral characteristic;
 receive an array of spectral data from a primary spectral measurement device, the array of spectral data relating to a measurement of a rendered color output by the primary spectral measurement device; and
 emulate the ancillary spectral measurement device by applying the predictive model with the loaded parameter values to the received array of spectral data to output a predicted array of spectral data for the ancillary spectral measurement device.

6. The medium of claim 5, storing instructions that, when executed by a processor, cause the processor to calibrate a color rendering engine based on the predicted array of spectral data.

7. The medium of claim 5, storing instructions that, when executed by a processor, cause the processor to obtain target prediction parameters, wherein the parameter values that are loaded depends on the target prediction parameters.

8. The medium of claim 5, storing instructions that, when executed by a processor, cause the processor to obtain target prediction parameters, the target prediction parameters being combined with the array of spectral data to condition the predictive model.

9. The medium of claim 7, wherein the target prediction parameters comprise data indicative of operating parameters for a color rendering device that is used to generate the rendered color output.

10. The medium of claim 5, storing instructions that, when executed by a processor, cause the processor to:
 obtain data indicative of a first spectral characteristic for a set of color test patches measured using a primary spectral measurement device;
 obtain data indicative of a second spectral characteristic for the set of color test patches measured using an ancillary spectral measurement device;
 generate a set of training samples by pairing measurements of the first and second spectral characteristic for the color test patches within the obtained data;
 train the predictive model using the set of training samples, data indicative of a measurement of the first spectral characteristic being used as an input for the predictive model and data indicative of a measurement of the second spectral characteristic being used as a ground truth output for the predictive model; and
 output data indicative of the parameter values for the predictive model.

11. A method comprising;
 obtaining data indicative of a first spectral characteristic for a set of color test patches measured using a primary spectral measurement device, the color test patches having been rendered on a color rendering device;
 obtaining data indicative of a second spectral characteristic for the set of color test patches measured using an ancillary spectral measurement device, the ancillary spectral measurement device performing a different spectroscopic measurement to the primary spectral measurement device;
 generating a set of training samples by pairing measurements of the first and second spectral characteristic for the color test patches within the obtained data;
 training a predictive model using the set of training samples, data indicative of a measurement of the first spectral characteristic being used as an input for the predictive model and data indicative of a measurement of the second spectral characteristic being used as a ground truth output for the predictive model; and
 outputting data indicative of trained parameter values for the predictive model,
 wherein a predictive model parameterized with the trained parameter values is usable to emulate an output of the ancillary spectral measurement device using data from the primary spectral measurement device.

12. The method of claim 11, wherein post-processing is applied to the set of color test patches before the second spectral characteristic is measured using the ancillary spectral measurement device.

13. The method of claim 11, wherein the predictive model is a polynomial regression model.

14. The method of claim 11, wherein the data indicative of a second spectral characteristic comprises spectral data representative of a measurement of at least one of:
 fluorescence;
 a spectral response over a range of wavelengths that differs from the first spectral characteristic;
 a spectral response with a wavelength interval that differs from the first spectral characteristic; and
 a spectral response measured with a spectral measurement technique that differs from the first spectral characteristic.

15. The method of claim 11, wherein the color test patches are measured using the ancillary spectral measurement device under a different illuminant than the measurement using the primary spectral measurement device.

* * * * *